United States Patent [19]
Horlitz et al.

[11] Patent Number: 5,303,621
[45] Date of Patent: Apr. 19, 1994

[54] CLAMPING DEVICE FOR A DEFINED CLAMPING OF WORKPIECES

[75] Inventors: Bernhard Horlitz, Solingen; Reiner Glomb, Velbert; Peter Maresch; Ralf Wagner, both of Solingen, all of Fed. Rep. of Germany

[73] Assignee: Th. Kieserling & Albrecht GmbH & Co., Solingen, Fed. Rep. of Germany

[21] Appl. No.: 716,670

[22] Filed: Jun. 17, 1991

[30] Foreign Application Priority Data

Jun. 16, 1990 [DE] Fed. Rep. of Germany ....... 4019285

[51] Int. Cl.⁵ .................................................. B23B 5/12
[52] U.S. Cl. ........................................ 82/1.11; 82/130; 226/176
[58] Field of Search ............... 82/1.11, 129, 130, 131, 82/127, 101, 113, 142, 147, 19, 73, 92; 226/176, 177, 181; 408/203.5; 409/132, 157, 195, 225, 259; 29/81.11; 51/80 A; 414/14

[56] References Cited

U.S. PATENT DOCUMENTS

| | | | |
|---|---|---|---|
| 3,527,126 | 9/1970 | Jones, Jr. ...................... | 226/176 X |
| 3,581,965 | 6/1971 | Shaver, Jr. ...................... | 226/177 |
| 3,627,187 | 12/1971 | Hartkopf ...................... | 226/176 X |
| 3,791,564 | 2/1974 | Hugonin ...................... | 226/176 X |
| 4,634,323 | 1/1987 | Wagner et al. ................. | 409/167 |

FOREIGN PATENT DOCUMENTS

| | | | |
|---|---|---|---|
| 116457 | 3/1951 | Fed. Rep. of Germany . | |
| 2322279 | 5/1974 | Fed. Rep. of Germany . | |
| 2651174 | 5/1979 | Fed. Rep. of Germany ........ | B23B 13/02 |
| 3141039 | 5/1983 | Fed. Rep. of Germany ........ | B65G 39/10 |
| 3240146 | 5/1984 | Fed. Rep. of Germany . | |
| 8701674.5 | 5/1987 | Fed. Rep. of Germany . | |
| 3728628A1 | 3/1989 | Fed. Rep. of Germany . | |
| 0905877 | 12/1945 | France ............................... | 82/130 |

*Primary Examiner*—Z. R. Bilinsky
*Attorney, Agent, or Firm*—Horst M. Kasper

[57] ABSTRACT

A clamping device is furnished, in particular for peeling machines for metallic bars (21) and tubes. The clamping device clamps the workpieces in a defined way at a preselected position (99) and independent of the diameter of the workpieces. The clamping device includes means for synchronization (64-69) of the motion of the clamping rollers (31, 32). The clamping position of the bar to be clamped can be varied by an adjustment device. The means for synchronization (64-69) of the clamping motion transfer a preselectable part of the clamping force, which is furnished such that the means for synchronization are held free from play via pre-clamping, during in all clamping phases. This eliminates vibrations of the bar (21) together with the clamping means (31, 62; 32, 63) or any undesired shifting of the clamping position.

27 Claims, 3 Drawing Sheets

CLAMPING DEVICE FOR A DEFINED CLAMPING OF WORKPIECES

BACKGROUND OF THE INVENTION

1. Field of the Invention

The invention relates to a clamping device for a defined clamping of differently sized workpieces including two movable clamping elements, which clamp the workpiece on two oppositely disposed sides, and a device for moving the clamping elements together with means for synchronizing the motion of the clamping elements.

2. Brief Description of the Background of the Invention Including Prior Art

In the context of the present invention, the term "defined tightening or defined clamping" concerns a clamping, where workpieces of different sizes are to be positioned, for example, with their center always at the same position in the course of clamping. This requirement exists in particular with tool machines which process rod links and semi finished products such as bars, tubes, or profiles. The requirement is further and in particular present in the case of centerless peeling machines. Peeling machines of this kind serve, in particular, to produce a so-called bright steel from hot-rolled metallic round stock. The bar-shaped round stock is peeled in this case at its cylindrical periphery by a rotary cutter head. The bar itself is secured axially, against undesired rotation and is led through the center borehole in the cutter head by the peeling machine. The rotating cutter head carries three or more inwardly directed cutters which peel the rod on a helical path. Such peeling machines are employed for wire, bars, and tubes. The peeling machines used at the present time operate with a feed-in apparatus on the feed-in side ahead of the cutter head. This feed-in apparatus includes two roller pairs and a clamping carriage is disposed on the discharge side of the cutter head. This clamping carriage secures the bar against twisting and transfers the bar when the rear end of the bar is being peeled. In addition, such peeling machines include guides immediately ahead of and after the cutter head. These guides center the workpiece and damp the vibrations generated by the peeling process.

Modern peeling machines and rough-turning machines can change the feed-in of the round stock during operation, the rotation speed of the cutter head, and the final dimension.

A peeling machine of the above recited kind is known from the German Patent DE-PS 2,055,888, which operates with an infeed roll apparatus, which is formed as a clamping device, and where its two roller pairs form possibly together with their supports the clamping elements and clamp the bar to be peeled centrically relative to the machine center. In other words, the two rollers of one pair are movable relative to the frame of the clamping device in a radial direction relative to the peeling machine center. A cylinder presses the two rollers against the workpiece. One roller is mechanically connected with the cylinder in this case, and the second roller is connected to the piston of the cylinder. The rollers of one pair are synchronized in their clamping motion. Each roller of a pair is hingedly connected via its roller to the ends of a rocker, pivotably supported at the frame of the clamping device. The two rollers are led and guided with their supports at the frame of the clamping device and they are moved apart and then led together for clamping purposes by a hydraulic cylinder. The rocker transfers no clamping forces in a standard situation. The rocker assures only that the clamping rollers are synchronously moved by the hydraulic cylinder.

It is a disadvantage of this clamping device that the center guiding of the bar to be peeled exhibits a play within the range of the tolerances of the synchronization means and, further, allows vibrations of the bars together with the clamping elements. The play of the unit, comprising the rollers with the clamped bar, can lead to an interference and disturbations of peeling and rough turning efficiency, in particular, after an extensive use of the clamping device.

SUMMARY OF THE INVENTION

1. Purposes of the Invention

It is an object of the present invention to furnish a play-free positioning of a workpiece in a clamping device of a peeling machine.

It is yet a further object of the present invention to improve a peeling machine such that the peeling machine provides a reliable and precise clamping of round stock in a centered position.

It is yet a further object of the present invention to provide a simple means which assure that the round stock employed is securely fastened in a precise position.

These and other objects and advantages of the present invention will become evident from the description which follows.

2. Brief Description of the Invention

According to the present invention there is provided for a clamping device for a defined clamping of workpieces of different sizes. A frame supports clamping elements. A first moving clamping element is mounted to the frame and formed by first clamping rollers. A second movable clamping element is mounted to the frame and formed by second clamping rollers. The first clamping rollers and the second clamping rollers clamp a workpiece at two oppositely disposed sides of the workpiece. A first force delivery device is mounted to the frame for moving the first clamping element and for moving the second clamping element for tightly engaging the workpiece.

Means for synchronization are provided for the motion of the first clamping element and of the second clamping element toward the workpiece. Part of the clamping force is transferred by the means for synchronization to one of the clamping elements.

According to the invention structure, the play in the means for synchronizing the clamping elements is eliminated based on a preselectable preclamping of the synchronization means.

According to a preferred embodiment of the invention the means for synchronization transfers a part clamping force to one clamping element. The part clamping force is smaller than half of the total clamping force.

In most application cases, there is claimed a 50% pretensioned force. Only a pretensioned force of less than 20%, i.e fifth of the clamping force, is required for the synchronization means in order to prevent that the complete system of the clamping elements including the clamped workpiece enters into vibrations based on the play in the means for the synchronization.

Preferably, a second force delivery device acts immediately only onto one of the clamping elements. Said second force delivery device can pretension the frame for supporting clamping elements against at least one of the clamping elements.

This additional force storage can be provided by an additional cylinder, by a spring, or by a weight load. Preferably, a hydraulic or pneumatic cylinder is employed. The force storage is supported at the frame of the clamping device and presses against a clamping element and thereby pretensions and preclamps the means for synchronization of the two clamping elements.

Starting at the clamping device, where each of the two clamping elements is furnished with its own force storage, the preferred embodiment of the invention includes that a first hydraulic cylinder-piston combination for the first clamping element can move the first clamping element. The first cylinder-piston combination can directly transfer a force onto the first clamping element, formed by the first clamping rollers. A second hydraulic cylinder-piston combination for the second clamping element moves the second clamping element. The second cylinder-piston combination directly transfers a force onto the second clamping element, formed by the second clamping rollers. The force supplied by the first cylinder-piston combination is different in size when compared with the force supplied by the second cylinder-piston combination.

The size of the difference of the forces, which are exerted immediately onto the individual clamping elements, can be achieved by a variation of the cylinder faces, i.e. where two cylinders are, for example, subjected to the same pressure. Alternatively, the same cylinders can also be employed at the two clamping elements, whereby a pretensioning of the complete clamping device is then achieved by a pressure difference. Also mixed structures can be furnished based on the present invention.

The present invention can be preferably employed in connection with peeling machines of the recited kind, where such peeling machines are realized at the infeed side or at the discharge side of the clamping and/or transfer unit. Since the infeed-side clamping and transfer unit is disposed closer to the cutter head, and since the influence of the vibrations and/or the importance of a staggering or canting is therefore larger, the invention structure is employed in particular at the infeed side clamping and transfer unit.

If the invention structure is employed at the clamping carriage disposed at the discharge side of the cutter head, then the usually provided clamping jaws correspond to the clamping elements.

According to a further embodiment of the invention a first slider can support the first clamping rollers. A second slider can support the second clamping rollers. The first slider can be tensioned relative to the second slider with the force delivery device. One of the first clamping rollers and one of the second clamping rollers opposing each other can be moved in a direction perpendicular to a longitudinal direction of the workpiece during a clamping operation. Said means for synchronization can further engage the first slider for transducing a force to one of the first rollers with a force storage element pressing said first rollers in part indirectly via the first means for synchronization.

The means for synchronization are loaded only with a part of the clamping force from the force storage, i.e., based on the individual case, with such a clamping force as is required for the balancing of the play. Upon use of an additional force storage for the loading of the synchronization means, the load can be selected individually for each clamping requirement.

According to the present invention a device can adjust the clamping position of the clamped workpiece. The device for adjusting is attached to the frame for supporting clamping devices.

This adjustment device can be furnished for setting the actual clamping position. The actual clamping position of the workpiece in the clamping plane is determined by said adjustment device, wherein a wear of the synchronization means can also be balanced.

According to the present invention said means for synchronization means can be attached to the frame. The synchronization means and the clamping elements form different strands. This further embodiment of the invention is directed to a special structure of the clamping device, where the synchronization means and the clamping means are co-acting parallel to each other, i.e. to clamping devices, where the clamping forces are substantially not transferred by the synchronization means. This separation of the clamping forces from the synchronization means is sensible where large clamping forces have to be transferred, for example, in case of a feed-in apparatus of a centerless peeling machine. The feed-in apparatus does in such case not only have to take care of the feed-in of the bar but it also has to counterbalance the cutting torque. This functional separation of clamping and synchronization of the clamping means is preferably employed in case of furnishing pair-wise a clamping device with clamping elements, disposed opposite to each other at workpiece to be clamped, for example, clamping rollers.

A centerless peeling machine according to the present invention comprises an infeed aggregate including a frame for supporting clamping elements. A first movable clamping element is mounted to the frame and is formed by first rollers. A second movable clamping element is mounted to the frame and is formed by second rollers. The first rollers and the second rollers clamp a workpiece at two oppositely disposed sides of the workpiece. A force delivering and transmitting device is mounted to the frame for moving the first clamping element and for moving the second clamping element for tightly engaging the workpiece. Means for synchronization are provided for the motion of the first clamping element and of the second clamping element toward the workpiece. Part of the clamping force is transferred by means for synchronization to one of the clamping elements. A hollow shaft follows the infeed aggregate in material advance direction. A rotating cutter head is disposed within the area defined by the interior of the hollow shaft.

Sliders can support the first rollers and the second rollers. A force delivering device can tension the sliders relative to each other. Means can move the respective first roller and the respective second roller of a pair of rollers in direction perpendicular relative to the longitudinal axis of the workpiece during a clamping operation. Means can be provided for synchronization of the sliders relative to the respective rollers. A force storage means can be associated with the means for synchronization for pressing one roller in part indirectly through the means for synchronization.

A device can adjust the clamping position of the clamped workpiece relative to an axis of the rotating cutter head.

According to the present invention, there is provided for a method of centerless peeling of workpieces comprising the following steps. A first mobile clamping element is formed with first rollers. A second mobile clamping element is formed with second rollers. The first clamping element and the second clamping element are supported on a frame. A workpiece with the first rollers and the second rollers clamp a workpiece at two oppositely disposed sides of the workpiece. The first clamping element and the second clamping element are moved for tightly engaging the workpiece with a force delivering and transmitting device mounted to the frame. Part of the clamping force is transferred with means for synchronization to one of the clamping elements. The motion of the first clamping element and of the second clamping element toward the workpiece are synchronized with said means for synchronization. The workpiece is moved into an area of a hollow shaft following the clamping elements in workpiece advance direction. A cutter head is rotated for engaging the workpiece. The cutter head is disposed within the area defined by the interior of the hollow shaft. The workpiece is peeled with the rotating cutter head based on a milling of the workpiece with a knife of the cutter head.

The first rollers and the second rollers can be slid with sliders supporting the first rollers and supporting the second rollers. The sliders can be tensioned relative to each other with a force supplied by a force delivery device. The respective first roller and the respective second roller of a pair of rollers can be moved in a direction perpendicular relative to the longitudinal axis of the workpiece with a means for moving during a clamping operation. The motion of the sliders can be synchronized relative to the respective rollers with means for synchronizing. One roller can in part be indirectly pressed through the means for synchronization with a force storage means associated with the means for synchronization.

The clamping position of the clamped workpiece can be adjusted relative to an axis of the rotating cutter head with a device for adjusting.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention, there is shown in FIG. 1, a schematic side elevational and in part sectional view of a peeling machine.

DESCRIPTION OF INVENTION AND PREFERRED EMBODIMENT

Figure 1:
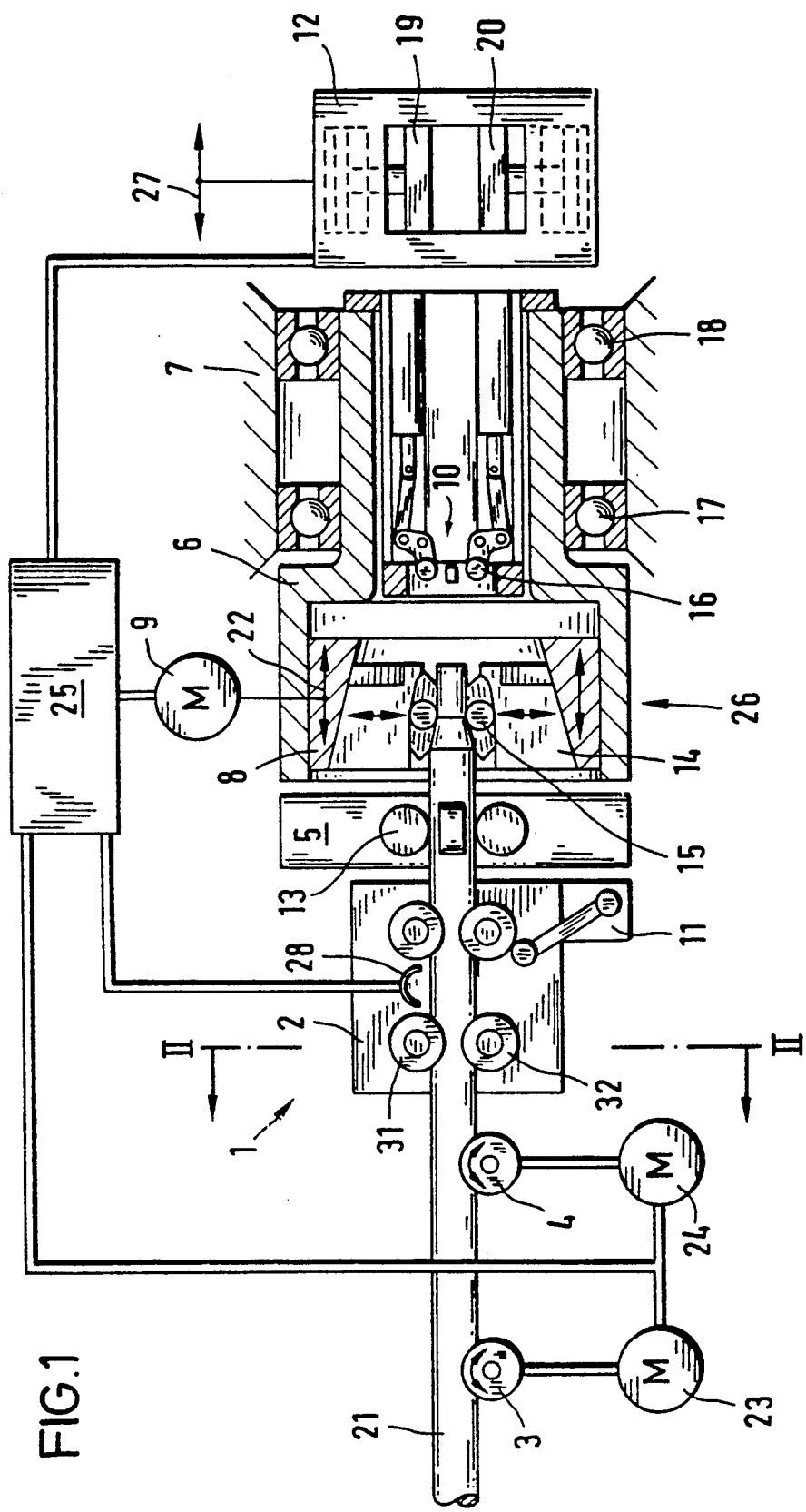

According to the present invention, there is provided for a clamping device for a defined clamping of workpieces 21 having different sizes. Two movable clamping elements, formed by rollers 31, 32 clamp a workpiece 21 at two oppositely disposed sides of the workpiece 21. A force delivering and transmitting device 61 is provided for moving the clamping elements. Means 90 for synchronization of the motion of the clamping elements are formed by rollers 31, 32. A clamping force is in part transferred by the means 90 for synchronization.

The clamping force transferred by the means 90 for synchronization is smaller than half of the total clamping force.

One or two force delivery elements 61; 82, 83 can move the two clamping elements 31, 32; 80, 81. An additional force delivery element 70 can be furnished. The additional force delivery element 70 acts immediately only onto one clamping element 32, 81. This additional force delivery element 70 can pretension the frame 57 of the clamping device against at least one of the clamping elements 32, 81.

A hydraulic cylinder for each clamping element can move the two clamping elements. Each cylinder-piston combination 41, 42 directly transfers a force onto the clamping elements, formed by the rollers 31, 32. The force supplied by two different cylinder-piston combinations are of different size.

Use of a clamping device is furnished at a centerless peeling machine 1 in front of and behind the rotating cutter head 26, respectively.

The peeling machine is furnished with a clamping device formed as a roller insertion apparatus 2. The clamping and transfer rollers 31, 32 can be supported at sliders. The sliders can be tensioned relative to each other by at least one force delivery device 61. The two rollers 31, 32 of a pair of rollers can be moved in a cross direction relative to the workpiece longitudinal axis during a clamping operation. A means 90 can be furnished for synchronization of the sliders 35, 36 relative to the rollers 31, 32. A force storage 42 can press one roller 31 in part indirectly via the synchronization means 90.

The peeling machine is furnished with a device 94 for adjusting the clamping position of the clamped workpiece 21.

The clamping device for a defined clamping of differently sized workpieces 21 is provided with the synchronization means and the clamping means form different strands.

The clamping device for a defined clamping of differently sized workpieces 21 is furnished with only two clamping elements, formed as rollers 31, 32, and disposed opposite at the workpiece and diametrically to each other at the workpiece and can be furnished in a plane, located perpendicular to the workpiece to be clamped.

A bar 21, which is peeled in a peeling machine 1, is illustrated in FIG. 1. The peeling machine comprises an infeed aggregate 2 with clamping and transfer rollers 31, 32, supported rotatably in the insertion aggregate and rotary driven in a way not illustrated in detail here, as well as a cutter head 26, disposed at a hollow shaft 6.

This hollow shaft 6 is rotary-driven supported in a conventional way in bearings 17, 18 in a machine frame 7. A discharge guide 10 clamps with its rollers 16 the further fed-in bars at the peeled section. A clamping carriage 12 is movable in a direction according to arrow 27, (FIG. 1) and secures the bar 21 with its clamping jaws 19, 20 against twisting at the end of the processing. This clamping carriage pulls the bar 21 from the peeling machine. The mode of operation of the peeling machine 1 is determined by a control device 25. The insertion aggregate, the servomotor 9 for the cutters 15, and the clamping carriage 12, among others are connected to the control device 25.

The cutter head 26 is disposed in an enlarged collar at the collar recess at the feed-in front side of the hollow shaft 6. A tapered sleeve 8 can be shifted by a servomotor 9 in the hollow shaft 6 in the throughout direction of the bar 21, as indicated with the arrow 22, while the hollow shaft 6 is rotating. Several cutter supports 14 are radially supported inwardly at the conical taper of the tapered sleeve 8. The cutter supports 14 are adjusted in a radial direction relative to the bar 21 in case of an axial shifting of the tapered sleeve 8. The cutters 15 at the cutter supports 14 peel, a layer of adjustable thickness from the bar 21, corresponding to the position of the cutter holders and of the tapered sleeve. The vibrations of the cutting process at the cutter head are clamped by the rollers 13 and 16 of the infeed guide 5 and the discharge guide 10, respectively.

An feed open roller table with feed rollers 3, 4, driven by motors 23, 24, is disposed at the feed-in side of the peeling machine 1. These feed rollers 3, 4 transfer the bar 21 into the area of the infeed aggregate 2.

The infeed aggregate 2 secures the bar 21 against rotation under the cutting torque, which is applied in the cutter head 26 to the bar. In addition, the infeed aggregate 2 furnishes the feed and throughput force based on a non-illustrated drive of the rollers 31, 32, in order to slide and shift the bar through the cutter head 26. A travel distance measurement device 11 is furnished at the infeed aggregate 2. This travel distance measurement device assures with a pulse counting method the desired distance travel lengths during the peeling of the bar 21.

The travel distance measurement is initiated by an initiator 28 at the discharge side of the first roller pair of the infeed aggregate 2.

Figure 2:
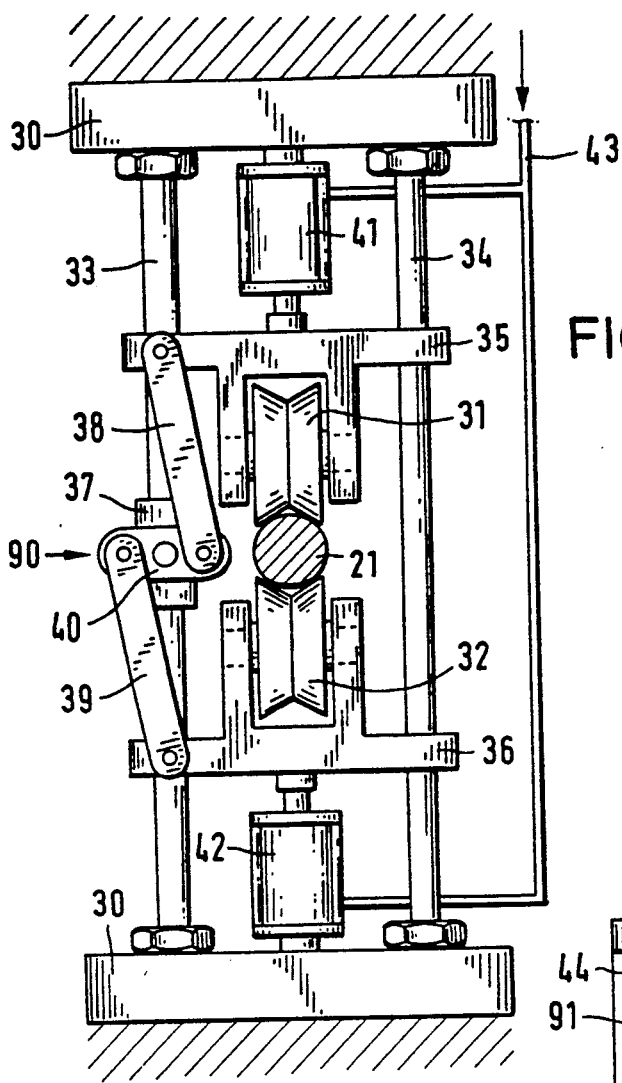
FIG. 2 is a side elevational and in part sectional view of a clamping device, formed as an infeed apparatus, at the peeling machine according to section line II—II of FIG. 1.

The infeed aggregate 2, illustrated in a simplified representation in FIG. 2, comprises a frame 30 with two guides 33 and 34, extending between an upper and a lower frame part. Sliders 35, 36 are guided at the guides 33, 34. The sliders 35, 36 support the rollers 31, 32, which rollers 31, 32 in turn clamp the bar 21 between each other. The rollers 31, 32 are rotary driven in a manner not illustrated in the drawings. Each slider is pressed against the round bar 21 by a cylinder 41, 42, supported at the frame 30. The two cylinders are fed from the same supply line 43. The motion of the sliders is controlled centrically relative to the desired clamping position of the bar 21 by the synchronization means 90. The synchronization means 90 comprise a centering piece 37 which is attached to the guide 33 and which determines the clamping position of the bar 21. A rocker 40 is rotatably supported at the centering piece 37. Two coupling connections 38, 39 are hinged like mirror images at the ends of the rocker 40. The coupling connections 38. 39 are connected to the sliders 35. 36 with the free ends of the coupling connections. The sliders 35, 36 with clamping rollers 31. 32 can move in opposite directions by only equal path lengths based on the synchronization means 90. An unchanged clamping position of the bar 21 or, respectively, of the longitudinal axis of the bar 21 results thereby. This holds for any arbitrary diameter of the bar within the clamping region of the infeed aggregates.

In order to balance the play present, for example, at the hinges of the synchronization means 90, the cylinder 42 is selected to be larger than the cylinder 41 with respect to the effective cylinder face. Since the two cylinders are furnished and fed with the same pressure from the feed line 43, and due to the recited equal sized motions of the slides 35, 36 with the rollers 31, 32, the excessive force is deflected and transferred into the synchronization means 90 and thereby into the slider 35 with the smaller clamping force derived from the cylinder 41, such that there is brought about a balancing of the clamping forces acting on the peeled bar 21. Based on the deflection of a part of the clamping force derived from the cylinder 42, the play in the synchronization means 90 is suppressed.

Figure 3:
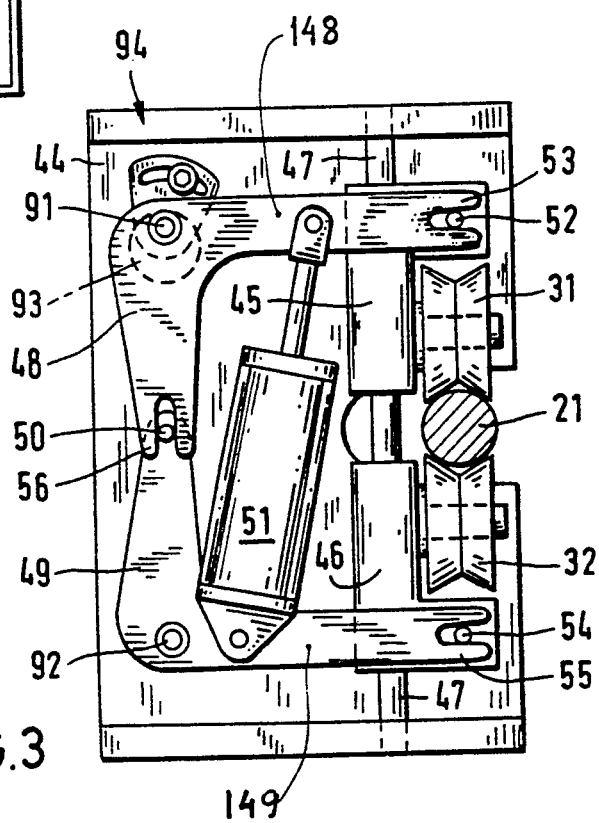
FIG. 3 is a schematic side view of an alternative embodiment relative embodiment of FIG. 2.

The infeed aggregate illustrated in FIG. 3 comprises a frame 44. This frame 44 supports a guide 47. Two sliders 45. 46 with the clamping rollers 31, 32 are disposed at the guide 47. The sliders 45, 46, with the clamping rollers 31, 32 secure the bar 21 against rotation and transfer the bar 21 in a direction perpendicular to the drawing plane in a manner not illustrated. The sliders 45, 46 with the rollers 31, 32 are pressed against the bar 21 by angle levers 48, 49. The motion of the angle levers 48. 49 is controlled by the cylinder 51. The angle levers 48. 49 are hingedly connected to a frame 44 at points 91, 92. The motion of the angle levers 48, 49 is synchronized at the free ends of the angle levers, which free ends are not connected to the sliders 45, 46. For this purpose, the angle lever 48 is furnished with a fork 56 at its free end. A pin 50 of the free end of the angle lever 49 engages and enters into the fork 56. Lever arms 148, 149 with their free ends disposed in the clamping plane, are hingedly connected to the sliders 45, 46. The cylinder 51 engages the lever arms 148, 149. The hinged connection comprises in each case a fork 53, 55. A pin 52, 54 engages into the fork 53, 55 on a slider side. The cylinder 51 is incorporated at an inclined angle and the cylinder 51 engages at the lever arms 148, 149 of different lengths relative to the hinged points 91, 92 or, respectively, the connection with the sliders 45, 46 at the angle levers 48, 49. The balancing of the clamping forces set initially unequal for purposes of this consideration, is performed via the synchronization means furnished by the hinged connection, formed by a pin 50 and a fork 56, between the free arms of the angle levers 48, 49 at the center between the hinge points 91, 92. The synchronization operates free from play by having the fork 56 and the pin 50 transfer a part of the clamping force of, for example, preferably about 10%.

An adjusting of the clamping position of the bar 21 is furnished at the hinged point 91. The hinge point 91 is formed at a cam 93, which is rotatably supported in the frame 44. The rotary position of the cam 93 is formed by a device 94, which includes a sector-shaped collar at the cam 93 as well as an elongated hole incorporated in the cam 93, where the elongated hole together with a clamping screw fixes the position of the cam 93 relative to the frame 44.

Figure 4:
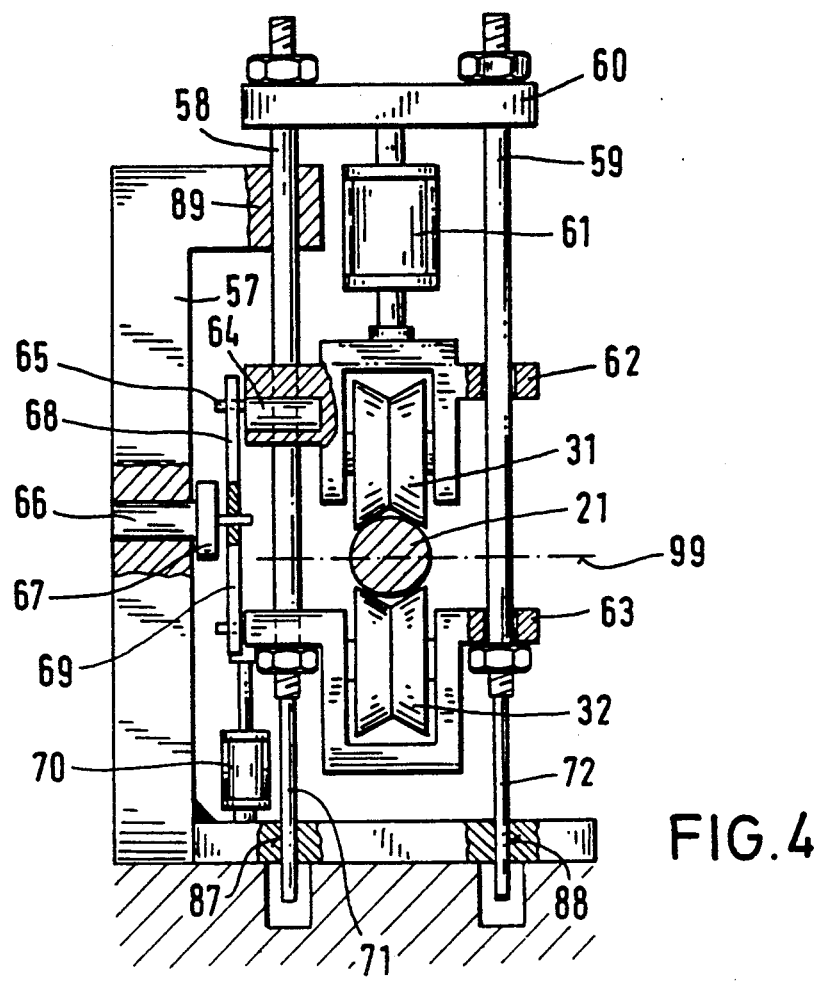
FIG. 4 is a further alternative embodiment of a clamping device in a peeling machine in the same drawing configuration as FIG. 2.

The embodiment of the invention illustrated in FIG. 4 comprises a frame 57. A unit of the guide rods 58, 59, which guide rods 58. 59 are rigidly connected to each other by way of a traverse bar 60 and by the roller support 63 with the roller 32, is movably guided at the locations 87, 88, 89 at the frame 57. The slider 62 with the roller 31 is movably guided at the guide rods 58, 59. The roller support 63 and the slider 62 are clamped against the bar 21 based on the force of the cylinder-piston combination 61. The roller support 63 and the slider 62 are synchronized in their motion by a device corresponding to the synchronization means 90 according to FIG. 2. This device includes a rocker 67, where the rocker 67 is rotatably supported in the frame 57 with a pin 66, coupling connectors 68, 69, which are movably connected on the one hand at the ends of the rocker 67 and on the other hand to the slider 62 or, respectively, the roller support 63. The weight of the unit comprising the guide rods 58, 59, the traverse bar 60, the slider 62, and the roller support 63 with the corresponding rollers, is finally suspended at the synchronization means and finally at the pin 66 of the rocker 67. In addition, a pretensioning cylinder-piston combination 70 is furnished for balances the weight of the unit. The cylinder-piston combination 70 can be switched pressureless or can be left out, where the weight of the unit is sufficient to assure a balancing of play in the synchronization means under most operating conditions.

Figure 5:
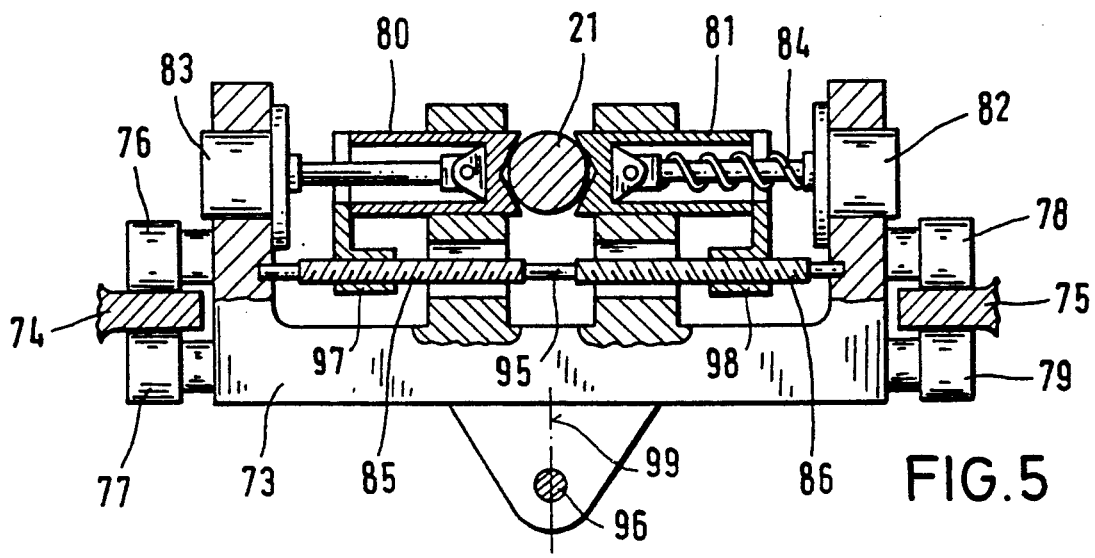
FIG. 5 is a side elevational and in part sectional view of a clamping device, formed as a clamping carriage, of the peeling machine.

The embodiment of a clamping device illustrated in FIG. 5 can be used in connection with a clamping carriage 12, illustrated in FIG. 1. The clamping carriage comprises a casing 73. The casing is movable at spatially fixed guides with rollers 76, 77, 78, 79 and comprises clamping jaws 80, 81 guided in at the casing 73. The clamping jaws 80, 81 are actuated by cylinders 82, 83 in order to clamp the bar 21. The drive for the clamping carriage engages at the point 96. The motion of the clamping jaws 80. 81 is synchronized by the threaded spindle 95. The threaded spindle 95 comprises two threaded sections 85, 86 with opposite thread pitch but where the size of the thread pitch is the same for the two threaded sections 85, 86. The threaded spindle 95 is supported on two sides in the casing 73 of the clamping carriage. Internal screw thread pieces 97, 98 are rigidly connected to the clamping jaws 80, 81, wherein the threaded sections 85, 86 are screwed into the internal screw thread pieces 97, 98. Due to the synchronization by the spindle, the clamping jaws 80, 81 move apart and back together centered relative to the clamping carriage center 99.

A spring 84 presses and completes synchronization free from play. The spring 84 is disposed, in addition to the cylinder 82, between the casing and the clamping jaw 81, and the spring 84 preclamps the synchronization means.

It will be understood that each of the elements described above, or two or more together, may also find a useful application in other types of clamping devices differing from the types described above.

While the invention has been illustrated and described as embodied in the context of a clamping device for a defined clamping of workpieces for precision machining, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A clamping device for a defined clamping of workpieces of different sizes, comprising a frame for supporting clamping elements;

a first movable clamping element mounted in an upper part of the frame and formed by at least one first clamping roller;

a second movable clamping element mounted in a lower part of the frame and formed by at least one second clamping roller;

a force delivery means mounted to the frame for moving the first clamping element with a first force and for moving the second clamping element with a second force, wherein the first force is unequal to the second force, such that the first clamping roller and the second clamping roller clamp a workpiece at two oppositely disposed sides of the workpiece for tightly engaging the workpiece;

means for synchronization of the motion of the first clamping element and of the second clamping element toward the workpiece, wherein the means for synchronization is connected to each of the clamping elements and wherein part of the clamping force is transferred by the means for synchronization from said delivery means to said first clamping element for exerting equal clamping forces on the first clamping element and on the second clamping element.

2. The clamping device according to claim 1, wherein the means for synchronization transfers a part clamping force to one clamping element, wherein the part clamping force is smaller than half of the total clamping force.

3. The clamping device according to claim 1, further comprising a second force delivery device for acting immediately only onto one of the clamping elements; means for pretensioning the frame for supporting the clamping elements against at least one of the clamping elements, wherein the means for pretensioning is associated with the second force delivery device.

4. The clamping device according to claim 1, further comprising a first hydraulic cylinder-piston combination for the first clamping element for moving the first clamping element, wherein the first cylinder-piston combination directly transfers a force onto the first clamping element, formed by the first clamping rollers;

a second hydraulic cylinder-piston combination for the second clamping element for moving the second clamping element, wherein the second hydraulic cylinder-piston combination directly transfers a force onto the second clamping element, formed by the second clamping rollers, and wherein the force supplied by the first hydraulic cylinder-piston combination is different in size when compared with the force supplied by the second hydraulic cylinder-piston combination.

5. The clamping device machine according to claim 1 further comprising a first slider supporting the first clamping roller;

a second slider supporting the second clamping roller, wherein the first slider is tensioned relative to the second slider with the force delivery means, and wherein one of the first clamping rollers and one of the second clamping rollers opposing each other are movable in a direction perpendicular to a longitudinal direction of the workpiece during a clamping operation and wherein first force storage means engage the first slider on the one side and the frame on the other side for transducing a force directly to the first slider with a roller element thereon and indirectly through said means for synchronization to the second slider.

6. The clamping device according to claim 5, further comprising
a device for adjusting the clamping position of a clamped workpiece, wherein the device for adjusting is attached to the frame for supporting clamping devices.

7. The clamping device according to claim 1, wherein said means for synchronization are attached to the frame, and wherein the means for synchronization forms a first force path and the clamping elements form a second force path.

8. The clamping device according to claim 1, wherein not more than two clamping elements, formed as rollers are employed, said first clamping element being disposed diametrically opposite to the second clamping element at the workpiece, and wherein the first clamping element and the second clamping element are located in a plane, located perpendicular to the workpiece to be clamped.

9. A clamping device for a defined clamping of workpiece (21) having different sizes, comprising
(a) two movable clamping elements, formed by rollers (31, 32) clamping a workpiece (21) at two oppositely disposed sides of the workpiece (21);
(b) a force delivering and transmitting means (61) for moving the clamping elements, wherein the force delivering means furnishes unequal forces to each respective one of the two movable clamping elements;
(c) means (90) for synchronization of motion of the clamping elements, formed by rollers (31, 32), wherein
(d) a clamping force is in part transferred from the force delivering and transmitting means by the means (90) for synchronization to one of the two movable clamping elements for generating an equal force at each of the two movable clamping elements.

10. The clamping device according to claim 9, wherein (e) the clamping force transferred by the means (90) for synchronization is smaller than half of the total clamping force.

11. The clamping device according to claim 9, further comprising
at least one force delivery element (61; 82, 83) for moving the two clamping elements (31, 32; 80, 81), wherein
(f) an additional force delivery element (70) is furnished, which additional force delivery element (70) acts immediately only onto one clamping element (32, 81), and which additional force delivery element (70) pretensions a frame (57) of the clamping device against at least one of the clamping elements (32, 81).

12. The clamping device according to claim 9, comprising
a hydraulic cylinder for each clamping element for moving the two clamping elements, wherein
(g) a cylinder-piston combination (41, 42) directly transfers a force onto the clamping elements, formed by the rollers (31, 32), and wherein the force supplied by two different cylinder-piston combinations are of different size.

13. A peeling machine comprising
a casing (7);
two movable clamping elements, formed by rollers (31, 32) clamping a workpiece (21) at two oppositely disposed sides of the workpiece (21);
a force delivering and transmitting means (61) for moving the clamping elements, wherein the force delivering and transmitting means delivers unequal forces to each respective one of the two movable clamping elements;
means (90) for synchronization of the motion of the clamping elements, formed by rollers (31, 32), wherein a clamping force is in part transferred by the means (90) for synchronization;
the clamping and transfer rollers (31, 32) are supported at sliders, which sliders are tensioned relative to each other by at least one force delivering means (61);
the two rollers (31, 32) of a pair of rollers are movable in a cross direction relative to the workpiece longitudinal axis during a clamping operation;
means (90) are furnished for synchronization of the sliders (35, 36) relative to the rollers (31, 32), wherein a force storage (42) presses one roller (31) in part indirectly via the means for synchronization (90) for generating an equal force at each of the two movable clamping elements.

14. The clamping device according to claim 13, wherein
a device (94) is furnished for adjusting a clamping position of the clamped workpiece (21).

15. The clamping device for a defined clamping of differently sized workpieces (21) according to claim 9, wherein (m) the synchronization means forms a first force path and wherein the clamping means forms a second force path.

16. The clamping device for a defined clamping of differently sized workpieces (21) according to claim 15, wherein
(n) only two clamping elements, formed as rollers (31, 32), and disposed opposite at a workpiece and diametrically to each other at the workpiece are furnished in a plane, located perpendicular to the workpiece to be clamped.

17. A centerless peeling machine comprising
an infeed aggregate including
a frame for supporting clamping elements,
a first movable clamping element mounted to the frame and formed by first rollers,
a second movable clamping element mounted to the frame and formed by second rollers, wherein the first rollers and the second rollers clamp a workpiece at two oppositely disposed sides of the workpiece,
a force delivering and transmitting device mounted to the frame for moving the first clamping element with a first force and for moving the second clamping element with a second force for tightly engaging the workpiece, wherein the first force is unequal to the second force, means for synchronization of the motion of the first clamping element and of the second clamping element toward the workpiece, wherein part of the clamping force is transferred by means for synchronization to one of the clamping elements for generating an equal force at each of the two movable clamping elements;
a hollow shaft following the infeed aggregate in material advance direction;

a rotating cutter head disposed within an area defined by the interior of the hollow shaft.

18. The peeling machine according to claim 17, further comprising
sliders supporting the first rollers and the second rollers;
a force delivering device for tensioning the sliders relative to each other;
means for moving the respective first roller and the respective second roller of a pair of rollers in direction perpendicular relative to the longitudinal axis of the workpiece during a clamping operation;
means for synchronization of the sliders relative to the respective rollers;
a force storage means associated with the means for synchronization for pressing one roller in part indirectly through the means for synchronization.

19. The peeling machine according to claim 18 further comprising
a device for adjusting a clamping position of a clamped workpiece relative to an axis of the rotating cutter head.

20. A method of centerless peeling of workpieces comprising
forming a first mobile clamping element with first rollers; forming a second mobile clamping element with second rollers;
supporting the first mobile clamping element and the second mobile clamping element on a frame;
clamping a workpiece with the first rollers and the second rollers to clamp the workpiece at two oppositely disposed sides of the workpiece;
moving the first mobile clamping element with a first force and moving the second mobile clamping element with a second force for tightly engaging the workpiece with a force delivering and transmitting means mounted to the frame, wherein the first force is unequal to the second force;
transferring part of the clamping force with means for synchronization to one of the clamping elements;
synchronizing the motion of the first mobile clamping element and of the second mobile clamping element toward the workpiece with the means for synchronization such that part of the clamping force is transferred by the means for synchronization from said force delivering and transporting means to said first mobile clamping element for exerting equal clamping forces on the first clamping element and on the second clamping element;
moving the workpiece into an area of a hollow shaft following the mobile clamping elements in workpiece advance direction;
rotating a cutter head for engaging the workpiece and wherein the cutter head is disposed within the area defined by the interior of the hollow shaft;
peeling the workpiece with the rotating cutter head based on a milling of the workpiece with a knife of the cutter head.

21. The method of centerless peeling according to claim 20, further comprising
sliding the first rollers and the second rollers with sliders supporting the first rollers and supporting the second rollers;
tensioning the sliders relative to each other with a force supplied by a force delivery device;
moving the respective first roller and the respective second roller of a pair of rollers in a direction perpendicular relative to a longitudinal axis of the workpiece with a means for moving during a clamping operation;
synchronizing the motion of the sliders relative to the respective rollers with means for synchronizing;
pressing one roller in part indirectly through the means for synchronization with a force storage means associated with the means for synchronization.

22. The method of centerless peeling according to claim 21 further comprising
furnishing a device for adjusting the clamping position of the clamped workpiece, and
adjusting the clamping position of the clamped workpiece relative to an axis of the rotating cutter head with the device for adjusting.

23. A clamping device for a defined clamping of workpieces of different sizes, comprising
a frame for supporting clamping elements;
a first movable clamping element mounted in an upper part of the frame and formed by at least one first clamping roller;
a second movable clamping element mounted in a lower part of the frame and formed by at least one second clamping roller;
a first force delivery means mounted to the frame for moving the first clamping element with a first force and for moving the second clamping element with a second force, such that the first clamping roller and the second clamping roller clamp a workpiece at two oppositely disposed sides of the workpiece for tightly engaging the workpiece, wherein the first clamping element and the second clamping element are disposed vertically such that forces acting on the second clamping element are bigger than forces acting on the first clamping element such as to compensate for the gravity forces acting on the workpiece;
means for synchronization of the motion of the first clamping element and of the second clamping element toward the workpiece, wherein the means for synchronization is connected to each of the clamping elements and wherein part of the clamping force is transferred by the means for synchronization from said second clamping element to said first clamping element, and auxiliary forces appear during the motion and clamping of the clamping elements on the workpiece such that the auxiliary forces acting on the second clamping element compensate for the gravity forces and a play in the synchronization means allowed to improve the synchronization of the motion of each of the clamping elements and to hold the workpiece in a designated position regardless of weight and diameter of the workpiece.

24. The clamping device according to claim 23, further comprising
a second force delivery device for acting immediately only onto one of the clamping elements;
means for pretensioning the frame for supporting the clamping elements against at least one of the clamping elements, wherein the means for pretensioning is associated with the second force delivery device and wherein pretensioning of the frame serves for removing a play in the clamping elements such as to improve the synchronization of moving the workpiece and to reduce vibrations of the workpiece thus improving the precision of peeling.

25. The clamping device according to claim 23, wherein said means for synchronization are attached to the frame and wherein the means for synchronization forms a first force path and the clamping elements form a second force path.

26. The clamping device according to claim 1, wherein the means for synchronization of the motion includes a link rod.

27. The clamping device according to claim 1, wherein the means for synchronization of the motion of the clamping elements is a link-rod element including a rocker in a center rotatably supported to a centering piece which is movably attached to a guide supported into the frame, two coupling connections hingedly attached like mirror images at ends of the rocker, wherein free ends of the coupling connections are hingedly mounted to the clamping elements.

* * * * *